United States Patent Office 2,706,709
Patented Apr. 19, 1955

2,706,709

PHOTOCHEMICAL CHLORINATION

Karl Wintersberger, Ludwigshafen (Rhine), and Otto Rommel, Ludwigshafen (Rhine-Oppau), Germany, assignors to Badische Anilin- & Soda-Fabrik Aktiengesellschaft, Ludwigshafen (Rhine), Germany No Drawing. Application May 16, 1951, Serial No. 226,751

Claims priority, application Germany May 27, 1950

5 Claims. (Cl. 204—163)

This invention relates to an improved process of carrying out photochemical chlorinations.

It is already known that many chlorination reactions are considerably accelerated or even only rendered possible by optical activation of chlorine. Apart from the employment of sunlight, which is often not very convenient on an industrial scale, electrically operated light sources are usually employed for this purpose.

We have now found that the radiation from chlorination reactions proceeding under luminous phenomena, in particular the radiation from the combination of chlorine and hydrogen, is capable in a high degree of optically activating chlorine so that, for example, hydrocarbons can be chlorinated therewith. Since in the said reactions, in particular in the combustion of hydrogen with chlorine, a considerable amount of heat is also set free, the latter can also often be advantageously utilized in order to promote the desired chlorination process. The process may be used for chlorinations in the narrow sense and also for example for sulfochlorinations.

The coupling of the energy-yielding reaction with the chlorination process to be activated may be carried out in a variety of ways. For example the hydrocarbon to be chlorinated may be brought to ignition together with hydrogen in a chlorine atmosphere, or a system of parallel, preferably concentric, quartz tubes may be employed, in the inner or outer of which the hydrogen-chlorine combustion may be allowed to proceed while the desired chlorination process is carried out in the other. By the interposition of filters when using separate reaction chambers it is readily possible to suppress, wholly or partially, the thermal or the optical action of the chlorine-hydrogen flame. Thus for example by interposing a jacket through which water flows, the transfer of heat can be substantially prevented, or by interposing suitable coloured filters the optically inactive or injurious radiations can be kept back.

Instead of the reaction of chlorine with hydrogen, other chlorination processes proceeding under luminous phenomena may be used for the activation of chlorine, as for example the reaction of finely divided metals with chlorine.

The following example will further illustrate this invention but the invention is not restricted to this example. The parts are by volume.

Example

Around a quartz tube in which a chlorine-hydrogen flame is burning there is arranged concentrically a wider tube through which is led a mixture of 20 parts of methane and 80 parts of chlorine per hour. The size of the chlorine-hydrogen flame is adjusted so that a temperature of about 250° to 300° C. is set up in the outer reaction chamber. By absorption of the cooled effluent gas from the outer tube with 9.5 parts of water there is obtained, besides dilute hydrochloric acid, 0.06 part of a liquid mixture of carbon tetrachloride and chloroform per hour.

What we claim is:

1. A process for photochemically chlorinating methane which comprises activating the chlorination by exposing a mixture of chlorine and methane to the radiations arising from a hydrogen-chlorine flame burning in a separate light-transmitting chamber, said mixture being led through a tube arranged concentrically around a quartz tube in which said flame is burning and said flame being adjusted to produce a temperature of about 250–300° C. in said first-named tube.

2. A process for photochemically chlorinating a saturated gaseous hydrocarbon which comprises activating the chlorination by exposing a mixture of chlorine and said hydrocarbon in a chamber to the radiations arising from a hydrogen-chlorine flame burning in a separate light-transmitting chamber, said flame being adjusted to produce a temperature of about 250–300° C. in said first-named chamber.

3. A process for photochemically chlorinating methane which comprises activating the chlorination by exposing a mixture of chlorine and methane in a chamber to the radiations arising from a hydrogen-chlorine flame burning in a separate light-transmitting chamber, said flame being adjusted to produce a temperature of about 250–300° C. in said first-named chamber.

4. A process for photochemically chlorinating a saturated gaseous hydrocarbon which comprises activating the chlorination by exposing a mixture of chlorine and said hydrocarbon in a chamber to the radiations arising from a hydrogen-chlorine flame burning in a separate light-transmitting chamber, said flame being adjusted to produce in said first-named chamber a sufficient temperature to promote said chlorination.

5. A process for photochemically chlorinating methane which comprises activating the chlorination by exposing a mixture of chlorine and methane in a chamber to the radiations arising from a hydrogen-chlorine flame burning in a separate light-transmitting chamber, said flame being adjusted to produce in said first-named chamber a sufficient temperature to promote said chlorination.

References Cited in the file of this patent

UNITED STATES PATENTS 2,462,669   Percy _____ Feb. 22, 1949